United States Patent [19]

Muchel et al.

[11] Patent Number: 4,518,231
[45] Date of Patent: May 21, 1985

[54] STEREOMICROSCOPE

[75] Inventors: Franz Muchel, Königsbronn; Fritz Strähle, Heubach-Lautern, both of Fed. Rep. of Germany

[73] Assignee: Carl-Zeiss-Stiftung, Heidenheim on the Brenz, Fed. Rep. of Germany

[21] Appl. No.: 490,583

[22] Filed: May 2, 1983

[30] Foreign Application Priority Data

May 12, 1982 [DE] Fed. Rep. of Germany ....... 3217776

[51] Int. Cl.³ .................. G02B 13/10; G02B 21/02; G02B 21/22
[52] U.S. Cl. .................... 350/516; 350/515; 350/414; 350/447; 350/436
[58] Field of Search ............... 350/515, 516, 514, 424, 350/436, 451, 414, 447

[56] References Cited

U.S. PATENT DOCUMENTS

| 1,501,059 | 7/1924 | Metz | 350/515 |
| 1,790,926 | 2/1931 | Konig | 350/414 |
| 2,406,526 | 8/1946 | Bennett et al. | 350/515 |
| 2,639,653 | 5/1953 | Fischer | 350/516 |
| 3,353,892 | 11/1967 | Minns et al. | 350/516 |

FOREIGN PATENT DOCUMENTS

| 701940 | 3/1931 | France | 350/516 |
| 907679 | 10/1961 | United Kingdom | 350/516 |

Primary Examiner—Jon W. Henry
Attorney, Agent, or Firm—Stonebraker, Shepard & Stephens

[57] ABSTRACT

A stereomicroscope in which the axes of the two stereo channels are guided in parallel behind the objective assembly. Two different embodiments of the objective assembly are disclosed. One embodiment contains a common main objective for both individual stereoscopic pencils as well as a pair of wedge prisms of dispersive action to correct for the chromatic aberration in the direction of the stereo base which is produced as a result of the eccentric passage of the individual pencils through the objective. The second embodiment comprises a pair of individual objectives (Greenough type) which are inclined to each other, as well as a pair of a chromatic wedge prisms in order to adapt the angle of inclination of the objectives to the parallel passage of the beam in the tube.

6 Claims, 6 Drawing Figures

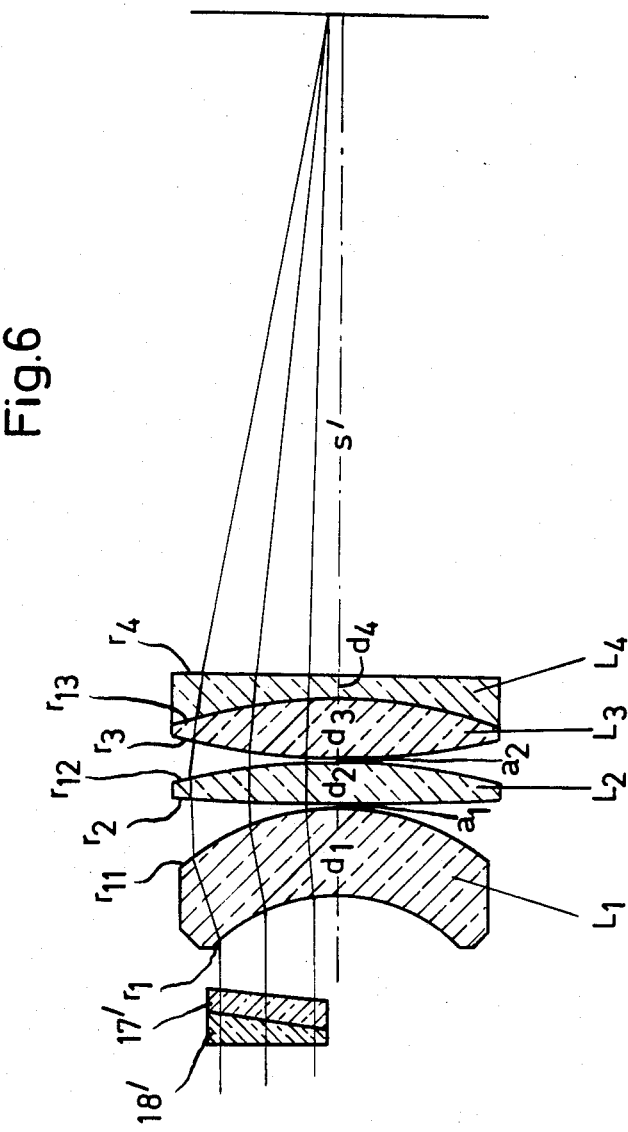

STEREOMICROSCOPE

BACKGROUND OF THE INVENTION

The present invention relates to a stereomicroscope having parallel conducted observation channels behind the objective assembly.

Two different types of stereomicroscopes are being used today, namely ones having a common main objective for both stereoscopic observation channels, and ones having separate objectives for the two observation channels (Greenough type).

In the first-mentioned type of stereomicroscopes the focal planes for both observation channels coincide, which results in edge-sharp images even in the case of high magnifications. The focal planes of Greenough stereomicroscopes form an angle with each other, which makes this type of microscope unsuitable for the viewing of long flat objects. On the other hand, Greenough microscopes have the advantage of being less expensive to manufacture than stereomicroscopes with common main objectives.

Both types of microscopes also have a number of other advantages and disadvantages as compared with each other. Thus, in the first-mentioned type of microscopes, despite extensive chromatic correction of the main objective, transverse chromatic aberration in the direction of the stereo base occurs, due to the non-concentric passage of the two stereo channels through the objective. This aberration, which in principle does not occur in Greenough stereomicroscopes, noticeably reduces the resolving power of stereomicroscopes having a common main objective. On the other hand, the attachment of accessories to stereomicroscopes of the Greenough type is difficult since the optical axes of the two stereo channels are normally inclined to each other.

From German Utility Model (Gebrauchsmuster) No. 69 26 292, it is known to make the mutually inclined axes of a Greenough stereomicroscope which are inclined to each other parallel by means of a pair of dispersive prisms, as illustrated in FIG. 9 of this Gebrauchsmuster. Further similar pairs of prisms are necessary for each image output in order to eliminate the chromatic aberration introduced by the deflection so that, in the final analysis, the axes of the stereo channels extend parallel to each other only in a small region between the prisms.

U.S. Pat. No. 3,353,892 of Minns and Hopkins, issued Nov. 21, 1967, describes a stereomicroscope having a common main objective in which the transverse chromatic aberration in the direction of the stereo base is compensated for by a pair of deflecting prisms. This microscope has observation channels which are inclined to each other, and thus becomes comparable to a Greenough microscope. The prisms are made of the same glasses as the common main objective. They must have a rather large wedge angle in order just to compensate for the prism effect of the non-concentrically traversed main objective.

The object of the present invention is to provide stereomicroscopes which have stereo axes which extend in parallel behind the objective assembly and in which chromatic aberrations in the objective assembly are corrected, and in which in particular, there is also no substantial chromatic aberration in the direction of the stereo base.

SUMMARY OF THE INVENTION

The above mentioned object is achieved by the present invention. Two embodiments of the invention are disclosed. In both embodiments, the axes of the two stereo channels are guided in paths parallel to each other behind the objective assembly. In the first embodiment, the objective assembly has two individual objectives inclined with respect to each other and a pair of achromatic deflecting wedge prisms behind these inclined objectives to compensate for the angle of inclination of the objectives.

In the second embodiment, a common main objective is used for both observation channels, and a pair of direct vision dispersive wedge prisms is provided to correct for the transverse chromatic aberration in the direction of the stereo base. Each of these prisms preferably consists of two thin individual prisms cemented to each other, the prism angles of which can be kept very small. In one example described below, the prism angles amount to 1 degree.

In each case it is advisable to combine objectives of different focal length with the corresponding wedge prisms into assemblies which are developed as replaceable parts, since the chromatic aberration to be compensated for depends on the focal length of the objectives used.

According to the first embodiment, there is selected the known construction of a Greenough stereomicroscope whose axes are directed parallel to each other by achromatic or apochromatic wedge prisms behind the pair of objectives. The prisms are preferably developed as a cemented component consisting of two individual prisms of glasses of anomalous dispersion, for instance the glasses FK 51 and KZFSN 4 listed in the published Glass Catalogue of the firm of Schott & Genossen, of Mainz, Germany.

In this solution, the same prisms can be used for all objectives. Nevertheless it is advisable to combine the prisms with the objectives into a single assembly developed as a replaceable part. If it is seen to it that the objective assemblies of this second type (Greenough) correspond in their essential data such as backfocus, beam cross-section, separation of the stereo channels, mechanical connection dimensions, etc., to the objective assemblies of the first-mentioned type, it is then possible to use assemblies of both types on one and the same basic microscope body.

The manufacturer is thus provided with the possibility of extensively standardizing his program of instruments, while the user can still select between two different types of microscopes which differ in price and capability from each other.

BRIEF DESCRIPTION OF THE DRAWINGS

FIG. 6 is a section through the lenses of an objective designed for the embodiment in accordance with FIG. 3.

DESCRIPTION OF THE PREFERRED EMBODIMENTS

Figure 1:
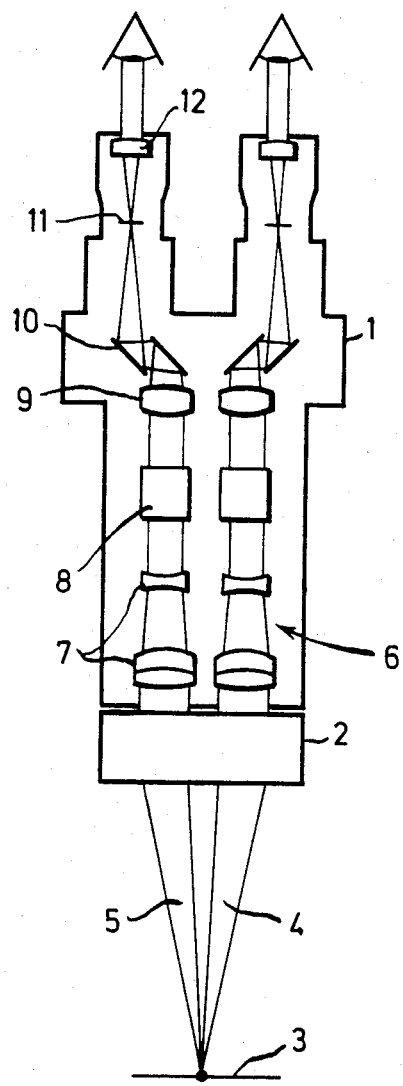
FIG. 1 is a schematic showing of the beam channels in a stereomicroscope according to the present invention, with stereo channels conducted parallel to each other.

The stereomicroscope shown in FIG. 1 comprises a base body 1 in which there is arranged the optical system necessary to conduct the two parallel stereoscopic ray channels. The base body 1 is provided on its object end with the objective assembly 2—not shown here in detail—which directs the observation channels 4 and 5 of the stereoscopic beam convergently onto the surface of the object 3.

The optical system of the base body 1 in which, for the sake of simplicity, only one of the two symmetrical ray paths has been provided with reference numbers, comprises a zoom system 6 having displaceable lens components 7, beam-splitter prisms 8 to enable the use of attachments, a tube lens 9 for producing the intermediate image 11 in front of the eyepiece 12, as well as a mirror step 10 for adjustment to the interpupillary distance of the observer.

Figure 2:
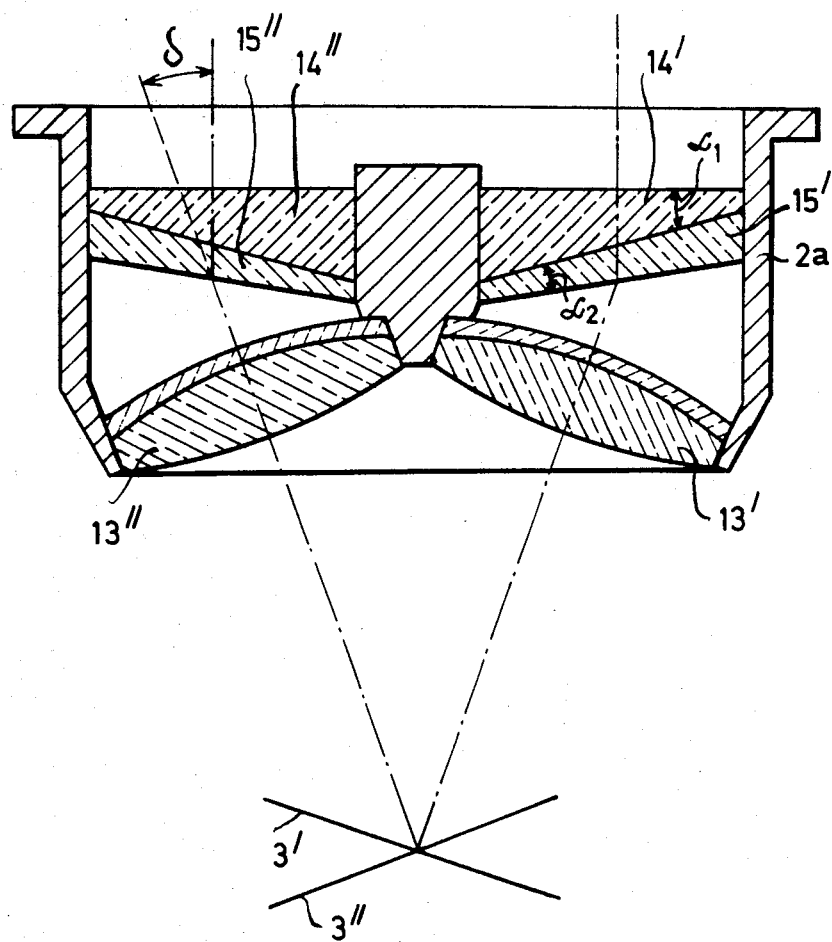
FIG. 2 is a cross-section through a first embodiment of the objective assembly 2 of FIG. 1.

The objective assembly 2 is replaceable. As shown in FIG. 2 it contains, in a first embodiment, two achromatic individual objectives 13' and 13" which are inclined to each other, and a pair of achromatic wedge prisms each formed of two parts 14 and 15 (i.e., the parts 14' and 15' behind the objective 13', and the parts 14" and 15" behind the objective 13"). In order to avoid chromatic aberration, these prisms serve to parallelize the axes of the objectives 13', 13" which are inclined in the manner of a Greenough stereomicroscope at an angle of 6° to the optical axis. These objective and prism elements are all within the mount or housing indicated at 2a in FIG. 2, which is replaceably or interchangeably mountable in the location shown at 2 in FIG. 1.

The data of the prisms 14 and 15 are set forth in the following Table I.

TABLE I

| Prism Angle | Glass | Refractive Indices | | | |
|---|---|---|---|---|---|
| | | $n_e$ | $n_C$ | $n_F$ | $n_g$ |
| 14 sin $\alpha_1$ = 0.400 | FK51 | 1.48794 | 1.48508 | 1.49088 | 1.49365 |
| 15 sin $\alpha_2$ = 0.161 | KZFSN4 | 1.61669 | 1.60990 | 1.62390 | 1.63085 |

Figure 4:
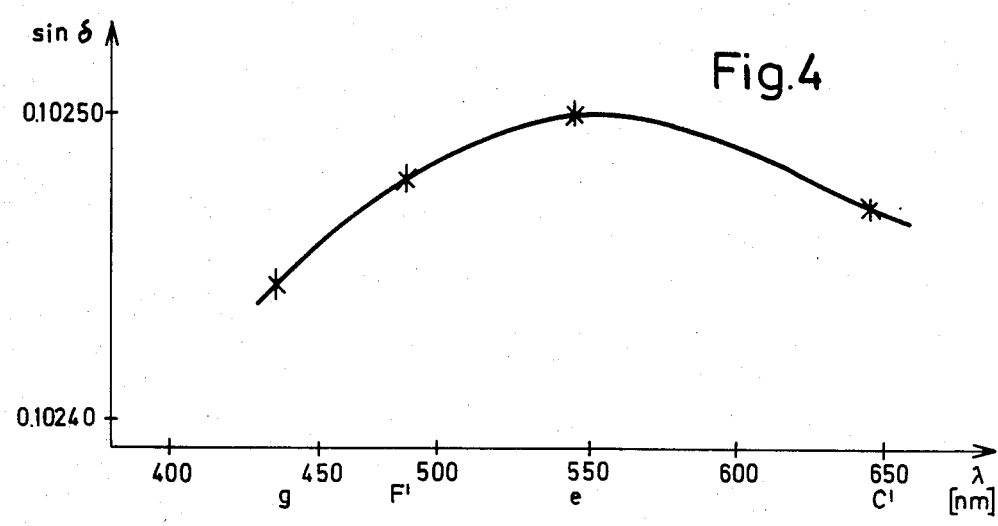
FIG. 4 is a graph showing the variation of the chromatic angular dispersion in the direction of the stereo base for the objective shown in FIG. 2.

In FIG. 4 the deflection angle sin δ produced by the prisms 14/15 is shown as a funtion of the wavelength λ. As a result of the anomalous dispersion of the glasses used, a color separation $\Delta \sin \delta_{e-g}$ at $6 \times 10^{-5}$ results even for the selected form of a cemented component of only two individual prisms, which leads to a transverse color aberration $\Delta x = 6 \times 10^{-3}$ mm in the object when using an objective having a focal length of f=100 mm. This value is below the limit of resolution of such an objective and can be disregarded.

Figure 3:
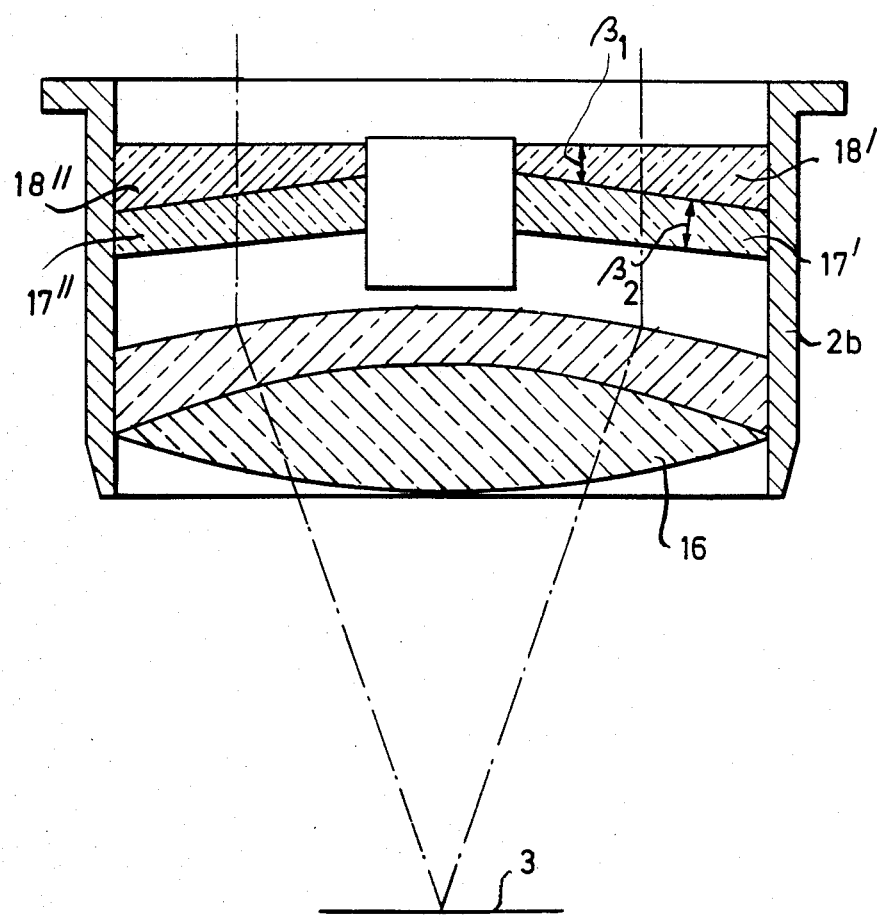
FIG. 3 is a cross-section through a second embodiment of the objective assembly 2 of FIG. 1.

FIG. 3 shows a second embodiment of the objective assembly 2. In this case, there is a common achromatic main objective 16 traversed by both stereo paths, as well as a pair of cemented correction prisms having components 17' and 18' and 17" and 18" respectively, all contained in a replaceable mount or housing 2b which, like the mount 2a of FIG. 2, is replaceably or interchangeably mountable in the location shown at 2 in FIG. 1.

The deflecting of the axes of the two stereo channels is effected in this second embodiment, by the objective 16. The prisms 17/18 (i.e., parts 17' and 18' behind one half of the diameter of the objective, and parts 17" and 18" behind the other half) serve merely to correct for the chromatic aberration in the direction of the stereo base caused as a result of eccentric passage through the objective 16. The prisms are developed as thin sheets and have relatively small wedge angles.

The objective assemblies 2a and 2b of the different types respectively shown in FIGS. 2 and 3 agree with each other in their essential data, such as initial backfocus, beam cross-section, separation of the two observation channels condition of chromatic correction, and their mechanical connection dimensions, to such an extent that they can be used interchangeably on the same microscope tube. Assemblies of the type shown in FIG. 3 are somewhat more expensive to manufacture due to the large diameter of the common main objective and the necessity of producing also different specifically adapted correction prisms for objectives of different focal length. On the other hand, however, the focal planes of the two stereo channels lie in a single plane, which is particularly advantageous when observing long flat objects under high magnification.

In FIG. 6 a lens section is shown for a concrete embodiment of a common main objective having a focal length f=100 mm. The objective consists, in a direction from the image side toward the object side, of a concave-convex collecting lens $L_1$, a biconvex collecting lens $L_2$, and a collecting cemented member with the two components $L_3$ and $L_4$, $L_3$ being a biconvex collecting lens element and $L_4$ a concave-planar dispersing lens element.

It has the data indicated in the following Table II for the radii r, the air distance or spacing a between the lenses, the lens thicknesses d, and the refractive indices $n_d$ and Abbe numbers $v_d$ of the glasses used.

TABLE II

| Lens | Radius | Thickness | Air Spacing | Index of Refraction $n_d$ | Abbe Number $v_d$ |
|---|---|---|---|---|---|
| $L_1$ | $r_1$ = −30.5 | $d_1$ = 15.0 | | 1.61772 | 49.77 |
| | $r_{11}$ = −38.1 | | $a_1$ = 0.2 | | |
| $L_2$ | $r_2$ = 538.6 | $d_2$ = 6.7 | | 1.58913 | 61.27 |
| | $r_{12}$ = −109.0 | | $a_2$ = 0.2 | | |
| $L_3$ | $r_3$ = 124.1 | $d_3$ = 9.7 | | 1.58599 | 61.04 |
| | $r_{13}$ = −84.7 | | | | |
| $L_4$ | $r_4$ = plano | $d_4$ = 4.0 | | 1.76180 | 26.95 |

Object-side back focus s' = 108.7 mm.
(All linear dimensions are in millimeters.)

The correcting wedge prisms used in combination with this objective are, in the same way as shown in FIG. 3, formed as a cemented member from two individual prisms and are arranged behind the objective on the image side. The distance between the objective and the prisms is not critical since the objective has an infinite initial backfocus and accordingly a parallel ray channel is present behind the objective.

The data of the wedge angles and glasses for these prisms are set forth in the following Table III.

TABLE III

| Prism Angle | Glass | Refractive Indices | | | |
|---|---|---|---|---|---|
| | | $n_e$ | $n_C$ | $n_F$ | $n_g$ |
| 17 sin $\beta_1$ = 0.01803 | Sk5 | 1.59142 | 1.58666 | 1.59635 | 1.60100 |
| 18 sin $\beta_2$ = 0.01513 | SFN64 | 1.71135 | 1.70014 | 1.72380 | 1.73637 |

The glasses for these prisms have a normal dispersion behavior since, by selection of a glass with anomalous dispersion (LgSK2) for the lens $L_3$ in the objective shown in FIG. 6, corrective action has already been exerted on the secondary spectrum. To be sure, it is also possible to select a "standard glass" for the said lens $L_3$, for instance the SK5 used for the lens $L_2$, and then provide glasses with anomalous dispersion for the prisms.

Figure 5:
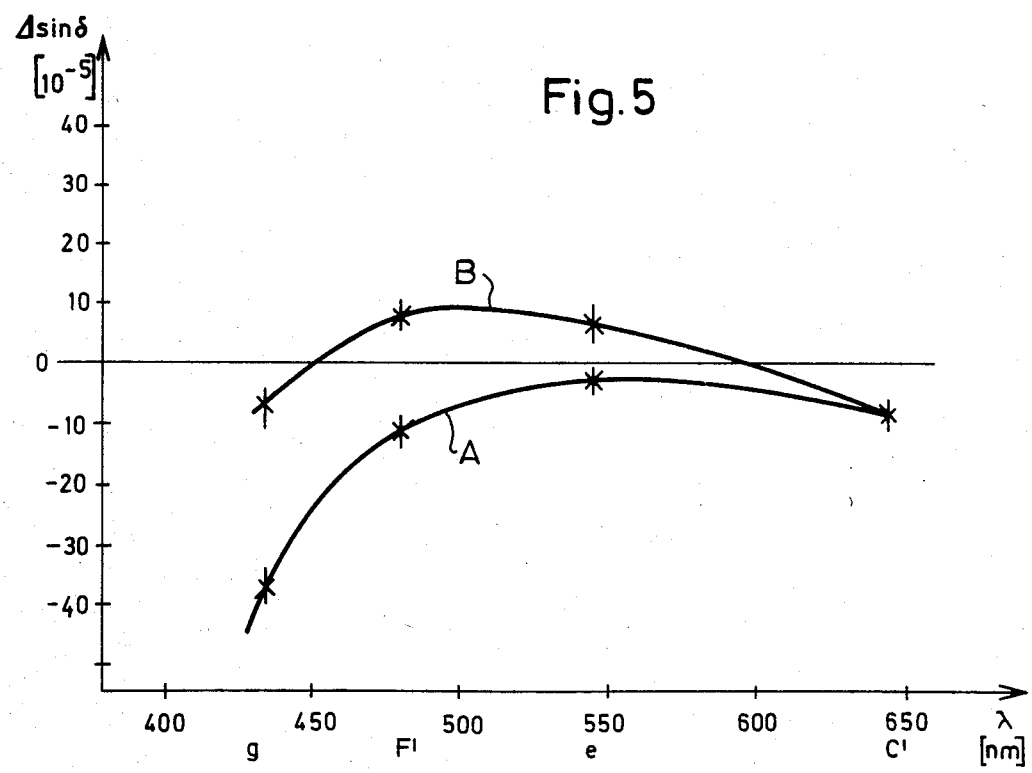
FIG. 5 is a graph showing the variation of the chromatic angular dispersion in the direction of the stereo base for the objective shown in FIG. 3.

FIG. 5 shows the wavelength-dependent difference of the deflection angle sin δ caused by the objective of FIG. 6. Curve A shows the conditions without the wedge prisms and curve B the conditions including the compensatory effect of the prisms 17/18. It can be seen that the chromatic angular difference $\Delta \sin \delta_{e-g} = 36 \times 10^{-5}$ in the direction of the stereo base which is present even when using a well-corrected objective has been reduced by means of the prisms to a value of $\Delta \sin \delta 10 \times 10^{-5}$.

Since the objective has a focal length f=100 mm, this results in a transverse chromatic aberration in the object of $1 \times 10^{-2}$ mm, which corresponds approximately to the limit of resolution of the objective.

What is claimed is:

1. A stereomicroscope having two parallel conducted observation channels behind an objective assembly, said objective assembly comprising
   (a) two individual objectives having respective optical axes which are inclined with respect to each other and with respect to said parallel channels,
   (b) two prism assemblies to compensate for the inclination of said optical axes of said objectives with respect to said parallel channels, and
   (c) a common housing containing said two objectives and said two prism assemblies, said common housing forming a replaceable and interchangeable part of said stereomicroscope,
   (d) each of said two prism assemblies including at least two cemented refractive wedge prism elements, one of said prism assemblies being mounted in operative relation to each of said objectives.

2. The invention defined in claim 1, wherein said prism elements are made of glass having anomalous dispersion.

3. The invention defined in claim 1, further comprising
   (e) an additional housing interchangeable with said common housing, said additional housing containing
      (i) a single common main objective for both of said observation channels.

4. The invention defined in claim 3, wherein said additional housing also contains
      (ii) a pair of direct vision dispersive wedge prisms, one for each observation channel, to compensate for transverse chromatic aberration in the direction of a stereo base.

5. The invention defined in claim 3, wherein said common main objective consists essentially of two single collecting lenses and a collecting cemented doublet.

6. The invention defined in claim 5, wherein said lenses have substantially the characteristics indicated in the following table;

| Lens | Radius | Thickness | Air Spacing | Index of Refraction $n_d$ | Abbe Number $v_d$ |
|---|---|---|---|---|---|
| $L_1$ | $r_1 = -30.5$ | $d_1 = 15.0$ | | 1.61772 | 49.77 |
| | $r_{11} = -38.1$ | | $a_1 = 0.2$ | | |
| $L_2$ | $r_2 = 538.6$ | $d_2 = 6.7$ | | 1.58913 | 61.27 |
| | $r_{12} = -109.0$ | | $a_2 = 0.2$ | | |
| $L_3$ | $r_3 = 124.1$ | $d_3 = 9.7$ | | 1.58599 | 61.04 |
| | $r_{13} = -84.7$ | | | | |
| $L_4$ | | $d_4 = 4.0$ | | 1.76180 | 26.95 |
| | $r_4 = $ plano | | | | |

Focal length f = 100 mm.
Object-side back focus s' = 108.7 mm.

* * * * *